Aug. 13, 1968   P. BUTTERWORTH   3,396,634
FLUID PRESSURE OPERATED LINEAR MOTOR
Filed Sept. 29, 1967   6 Sheets-Sheet 1

United States Patent Office 3,396,634
Patented Aug. 13, 1968

3,396,634
FLUID PRESSURE OPERATED LINEAR MOTOR
Philip Butterworth, Bramhall, England, assignor to Butterworth Hydraulic Developments Limited, Manchester, England
Continuation-in-part of application Ser. No. 530,640, Feb. 28, 1966. This application Sept. 29, 1967, Ser. No. 671,680
Claims priority, application Great Britain, Mar. 9, 1965, 9,858/65
14 Claims. (Cl. 91—224)

ABSTRACT OF THE DISCLOSURE

A fluid-pressure operated linear reciprocating motor having in combination a biased piston and biased spool mutually controlling reversal of each other, in which hydraulic lock is prevented by the provision of two spool signalling passages both controlled by the piston. Each spool signalling passage alternately admits pressure to, and releases exhaust from the chamber at the end of the spool cylinder which acts in opposition to the bias. The two passages operate alternately with each other, so that there is no position in which applied pressure or resumption of applied pressure cannot effectively act to move the motor.

*Cross reference to related application*

This application is a continuation-in-part of my co-pending application Ser. No. 530,640, filed Feb. 28, 1966, now abandoned.

*Background of the invention*

This invention relates to fluid-pressure operated linear motors, and is concerned with reciprocating biased piston motors which are controlled by the action of a reciprocating biased spool valve.

By a biased piston motor is meant a linear motor in which a piston operates back and forth in a cylinder; the piston having differing effective end areas, the smaller of which defines, with one end of the piston cylinder, a chamber which is continuously open to fluid inlet pressure (herein called "the constant pressure piston chamber"), while the larger defines, with the other end of the cylinder, a chamber which is alternately open to inlet pressure and exhaust (herein called "the variable pressure piston chamber"). Such pistons are sometimes termed "differential type pistons." A reciprocating biased spool valve operates on exactly the same principle as a reciprocating biased piston, and has a constant pressure spool chamber and a variable pressure spool chamber.

It will be apparent that when the variable pressure piston chamber is open to exhaust, the inlet pressure in the constant pressure piston chamber will move the piston in the direction of its bias, but that when inlet pressure is admitted to the variable pressure piston chamber, its application to the larger effective end area of the piston will overcome the bias, and thus move the piston in the direction against its bias.

The control of pressure flow to, and exhaust flow from, a biased piston motor may be carried out by several different means, depending upon the type of valve employed by the designer.

One common form of valve used in such motors is a reciprocating spool valve, and by suitable arrangement of passages and ports in the motor, reversal of the spool can be caused alternately to subject the variable pressure piston chamber to pressure and exhaust; likewise reversal of the piston can be caused alternately to subject the variable pressure spool chamber to pressure and exhaust.

Motors of this kind are exemplified by the constructions shown in German Patents 338,430 and 736,778; United Kingdom Patent 1,004,692 and U.S. Patents 2,966,893, 2,966,894 and 2,966,895, and Swedish Patent 141,366 of which all but the last employ a biased spool valve.

A difficulty which is frequently experienced in motors of this kind is the tendency to "stall," i.e., the possibility that the motor may come to rest in a position where flow through the system is blocked. For example, in U.K. specification 1,004,692, the mechanism appears to be illustrated in a stalled condition, since liquid from the variable pressure piston chamber cannot escape, nor can pressure be admitted because the inlet and exhaust ports are blocked by lands on the spool. Similarly, liquid from the variable volume spool chamber of that mechanism cannot escape through, nor can pressure be admitted to this chamber, because the porting is similarly blocked by a land on the piston, so that a condition of hydraulic lock obtains and the motor cannot commence to operate until either the piston or the spool is moved by some external force other than fluid pressure.

In some cases, this stalling difficulty is overcome by permitting a deliberate leak from the pressure side to the exhaust side, so that even if the motor does stall momentarily, such leakage will eventually permit one or other of the piston or spool to move from the locked position, whereafter movement of the motor will recommence. This expedient seems to have been adopted in the three U.S. patents referred to above.

*Summary of the invention*

A primary object of the present invention is to provide a motor of the kind stated, in which the flow to and exhaust from the variable pressure spool chamber is so controlled that stalling of the motor cannot take place.

Another object of the present invention is to provide a compact motor of the subject type in which the spool is located within the piston, and in which due to the location of the spool and the several signalling passages within the piston results in a compact mechanism in which the external pipe work is reduced to a single inlet and a single exhaust or outlet connection.

The invention accordingly provides a fluid-pressure operated linear reciprocating motor, having in combination a biased piston and biased spool mutually controlling reversal of each other, in which the constant pressure piston chamber and the constant pressure spool chamber are always open to flow of fluid under pressure from the inlet or supply side; while flow to and exhaust from the variable pressure piston chamber are controlled by movement of the spool, and flow to and exhaust from the variable pressure spool chamber are controlled by movement of the piston. The improvement of this invention is that flow to and exhaust from the variable pressure spool chamber pass through two spool signalling passages, one end of each passage being alternately opened and closed by movement of the piston, while the other end of each passage is alternately opened and closed by movement of the spool; this action taking place in sequence, so that after the one end of either passage has been opened by the piston, it does not close until the one end of the other passage has been opened by the piston, and after the other end of either passage has been opened by the spool, it does not close until the other end of the other passage has been opened by the spool, with the result that while flow is taking place through the motor there is always a pressure acting to urge the spool in one or other direction and the further result that if the flow is interrupted and recommenced, there will at once be set up a pressure acting to urge the spool in one or other direction.

The piston reciprocates substantially continuously, though not necessarily at a constant speed, but the spool remains stationary for a short period at the end of its stroke in each direction. The speed of movement of the piston is relatively slower than that of the spool.

The cycle of operations is phased as follows:

(i) The spool reaches the end of its stroke in the direction of its bias and remains stationary at the end of that stroke for a short period, while the piston is moving in the direction against its bias;

(ii) The spool commences to move in the direction against its bias, while the piston is completing its stroke in the direction against its bias;

(iii) The piston reverses to move in the direction of its bias, as, or fractionally before, the spool reaches the end of its stroke in the direction against its bias;

(iv) The spool reaches the end of its stroke in the direction against its bias and remains stationary at the end of that stroke for a short period, while the piston is moving in the direction of its bias;

(v) The spool commences to move in the direction of its bias, while the piston is completing its stroke in the direction of its bias;

(vi) The piston reverses to move in the direction against its bias, as or fractionally before, the spool reaches the end of its stroke in the direction of its bias.

It will be understood that after phase (vi) phase (i) recurs and so on.

Brief description of the drawing

A preferred embodiment of the invention will now be described in detail by way of example only, with reference to the accompanying illustrative drawings of a hydraulic motor in which:

FIGURES 1a to 6a are respectively similar views to FIGURES 1 to 6, but with the piston turned through 90° to show further ports and passages not visible in FIGURES 1 to 6.

It will be understood that FIGURES 1 and 1a, 2 and 2a, 3 and 3a, 4 and 4a, 5 and 5a, and 6 and 6a are to be read together as pairs.

Figure 1:
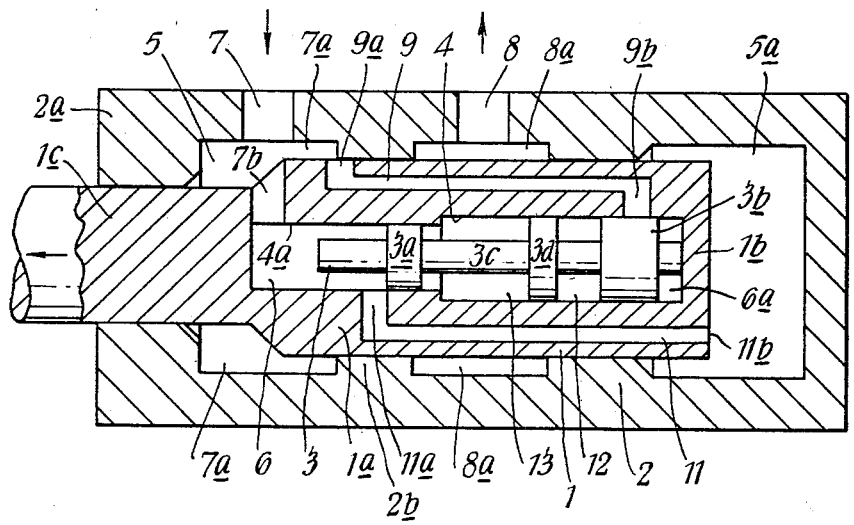
FIGURES 1 to 6 are all longitudinal sectional views through the cylinder, piston and spool showing the positions of the moving parts at various phases in their working cycle.
Figure 2:
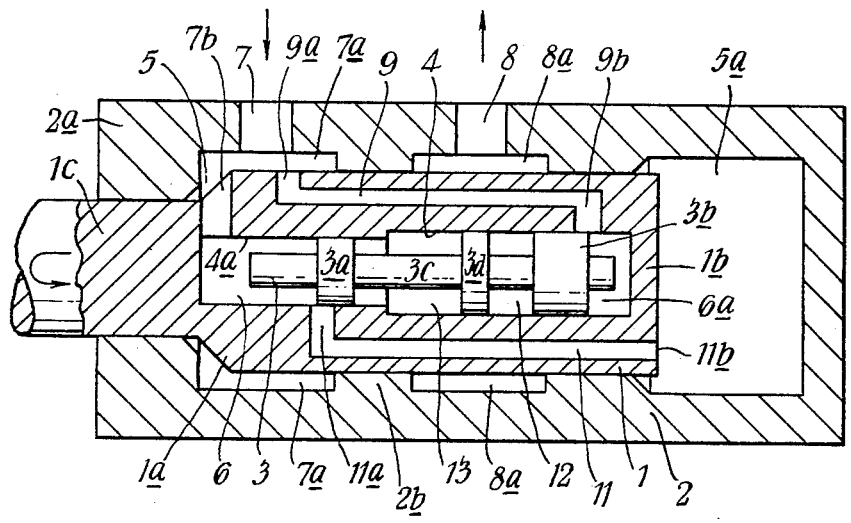
Figure 1A:
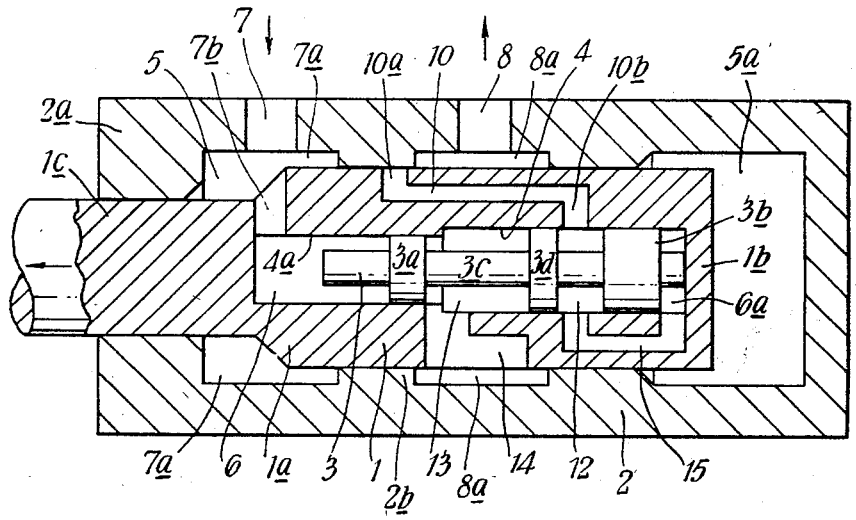
Figure 2A:
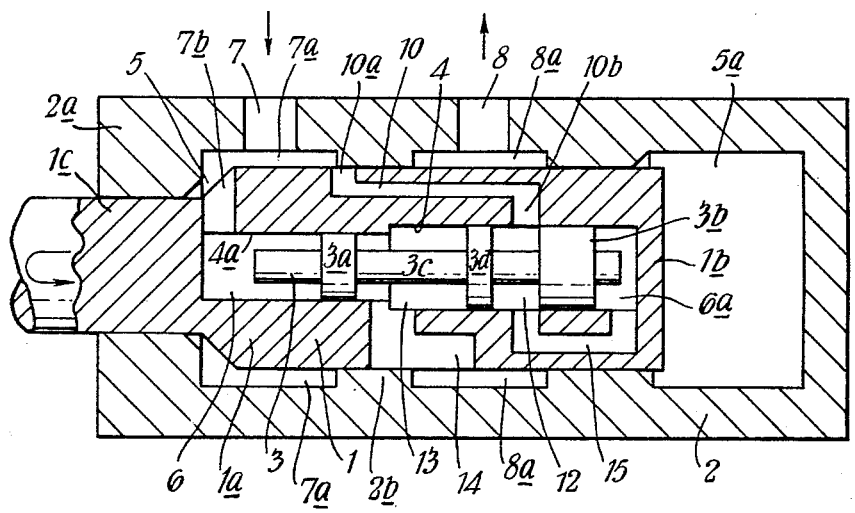
Figure 3:
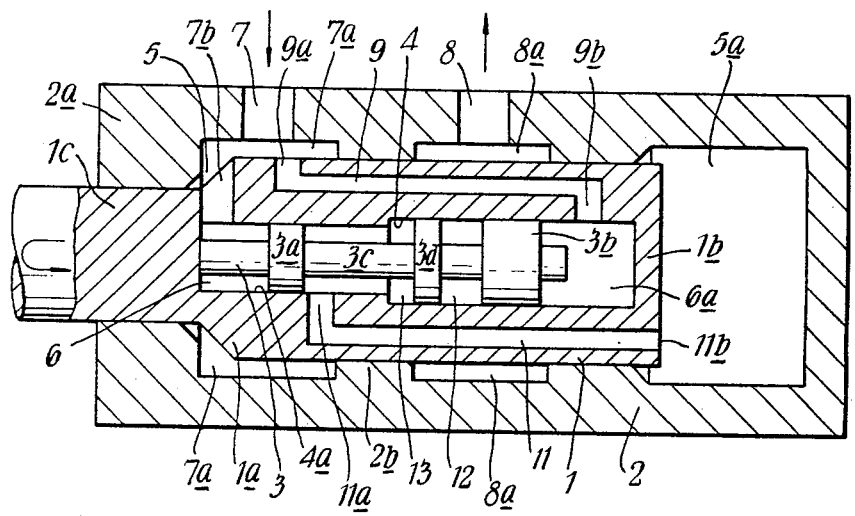
Figure 4:
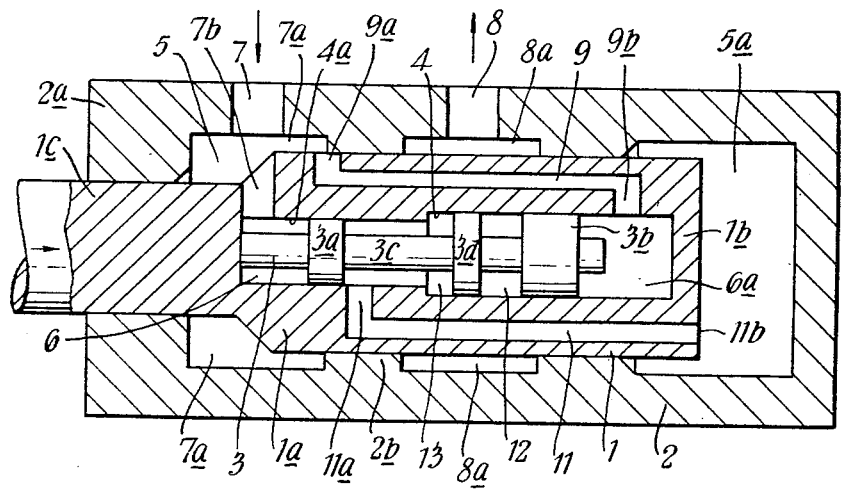
Figure 3A:
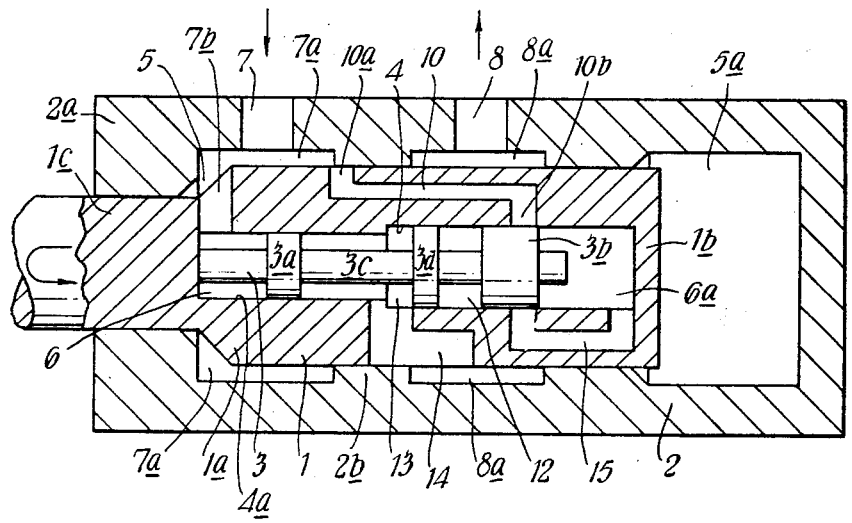
Figure 4A:
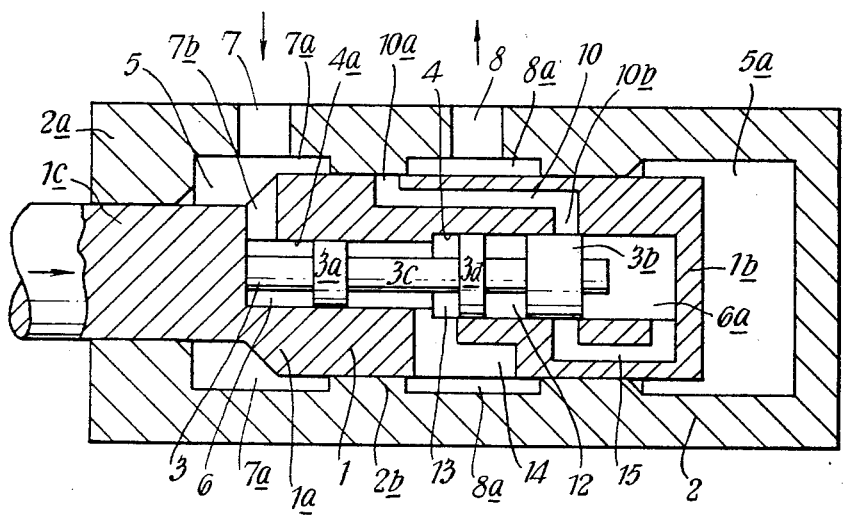
Figure 5:
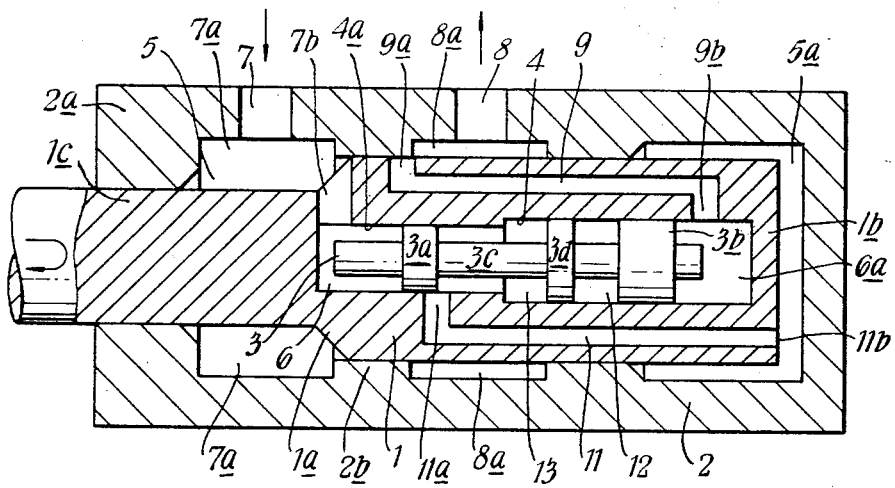
Figure 6:
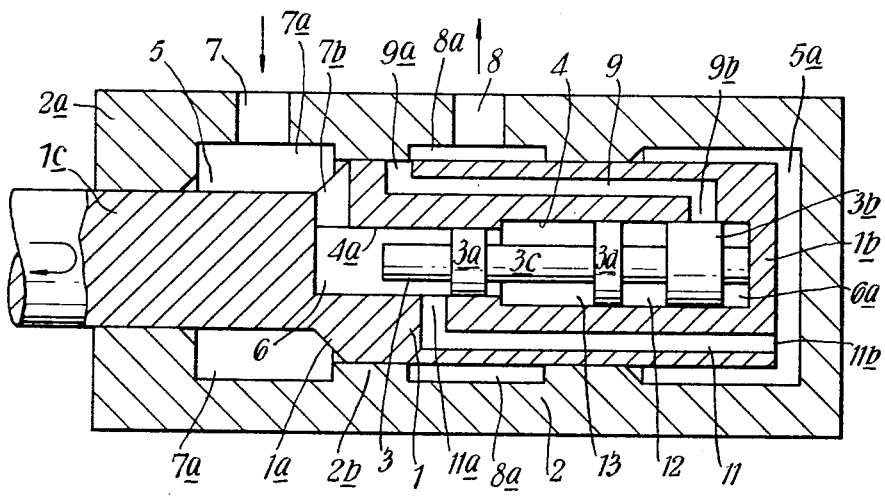
Figure 5A:
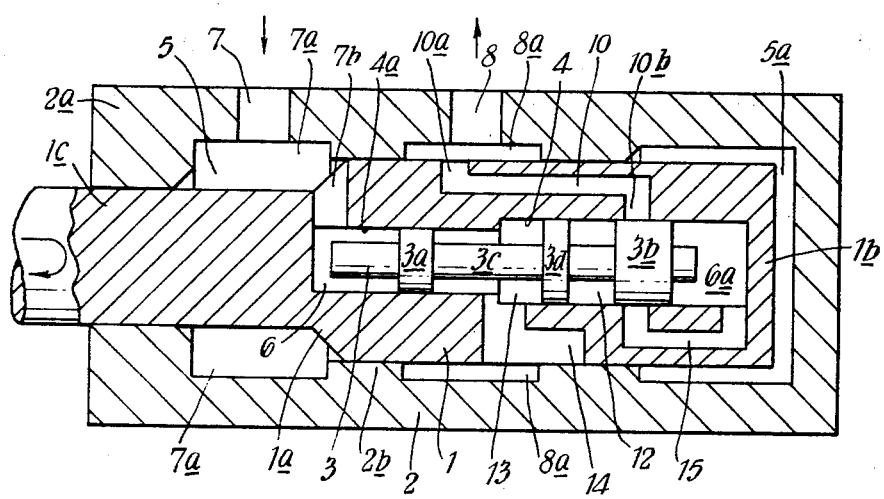
Figure 6A:
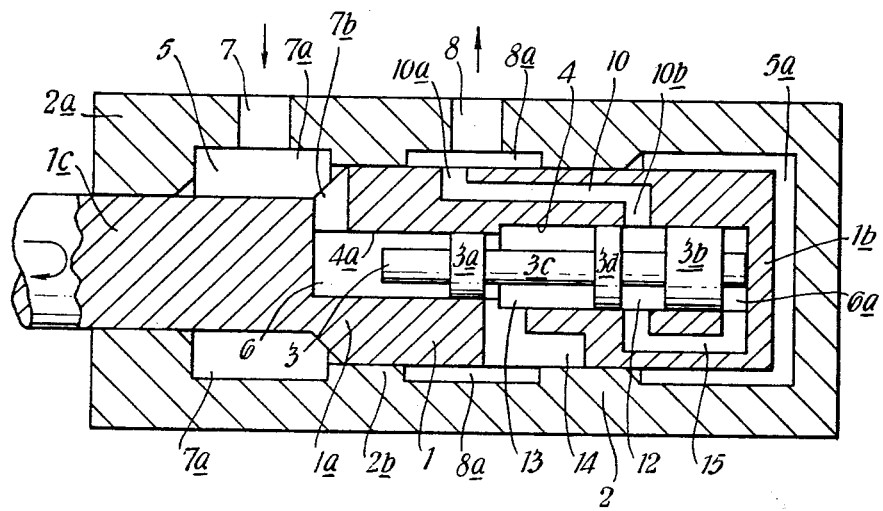

FIGURES 1 and 1a show phase (i) of the cycle of operations.
FIGURES 2 and 2a show phase (ii) of that cycle.
FIGURES 3 and 3a show phase (iii) of that cycle.
FIGURES 4 and 4a show phase (iv) of that cycle.
FIGURES 5 and 5a show phase (v) of that cycle.
FIGURES 6 and 6a show phase (vi) of that cycle.

Description of a preferred embodiment

Referring generally to the drawings, the motor of the preferred embodiment is a construction in which a differential or biased piston 1 operates in a cylinder 2, and contains within itself a further stepped bore 4, 4a constituting a two part spool cylinder, in which is carried a differential or biased spool 3. The part 4 of the spool cylinder is of larger diameter than the part 4a, this being a convenient (but not the only) way of providing differential effective areas on the end faces of the spool.

The cylinder 2 is closed at one end by a piston rod 1c affixed to the piston 1, which rod passes through the end 2a of the cylinder.

The end 1a of the piston having the smaller effective area defines, with the relevant end of the cylinder 2, a constant pressure piston chamber 5. The other end 1b of the piston having the larger effective area defines, with the relevant end of the cylinder 2, a variable pressure piston chamber 5a.

A cylindrical land 3a at the end of the spool having the smaller effective area defines, with the relevant end of the spool cylinder, a constant pressure spool chamber 6. A cylindrical head 3b at the other end 3b of the spool having the larger effective area defines with the relevant end of the spool cylinder, a variable pressure spool chamber 6a.

An inlet port 7 is provided in the wall of the piston cylinder 2, for continuous supply of pressure fluid, and communicates with an annular groove 7a formed in the bore of the piston cylinder 2, which groove extends axially for some distance along the cylinder bore, and opens into the constant pressure piston chamber 5, and also into the constant pressure spool chamber 6, by way of a transverse passage 7b in the piston.

An exhaust port 8 is provided in the wall of the piston cylinder 2, for intermittently exhausting the variable pressure piston chamber 5a and the variable pressure spool chamber 6a, and communicates with an annular groove 8a formed in the bore of the piston cylinder 2, which groove extends axially for some distance along the cylinder bore. The groove 8a is able to communicate with the variable pressure piston chamber 5a and variable pressure spool chamber 6a through spool signalling passages 9 and 10, and further passages described later.

The portion of the piston cylinder 2 between the groove 7a and the groove 8a constitutes a land 2b which is important as it serves to time the opening and closing of the spool signalling passages which are described later.

Fluid under pressure is alternately fed to, and exhausted from, the variable pressure piston chamber 5a, by way of a passage 11 (herein called "the piston signalling passage") which has a port 11a at one end which opens into the spool cylinder 4a part way along the length of the cylinder, and has a port 11b at the other end opening into the variable pressure piston chamber 5a. As will be described later, reciprocation of the spool 3 alternately places the piston signalling passage 11 in communication with pressure and exhaust, thus in turn submitting the variable pressure piston chamber 5a to pressure and exhaust, and causing the piston 1 to reciprocate.

Fluid under pressure is also alternately fed to, and exhausted from, the variable pressure spool chamber 6a by way of the two spool signalling passages 9 and 10 formed in the interior of the piston 1. The respective outer ends 9a, 10a of these passages open into the piston cylinder 2, while their respective inner ends 9b, 10b open into the spool cylinder 4.

The effective area of the end 1b of the piston 1 is greater than the effective area of the opposite end 1a of the piston 1, so that if fluid pressure in the variable pressure piston chamber 5a is equal to the fluid pressure in the constant pressure piston chamber 5, the piston 1 will tend to travel against the direction of its bias, i.e. in the direction of the arrow A. If the pressure supply from the inlet port 7 is cut off from the variable pressure piston chamber 5a and this chamber is placed in communication with the exhaust port 8 in the cylinder 2, the piston 1 will tend to travel in the direction of its bias, i.e. in the direction of the arrow B. Reciprocation of the piston 1 is therefore effected by alternating the pressure supply to, and exhaust from, the variable pressure piston chamber 5a, and this in turn is achieved by reciprocal movement of the spool 3, which, by alternately opening and closing the appropriate passages, acts as a change-over or reversing spool.

The biased spool 3 carried in the spool cylinder 4, 4a in the piston 1, comprises a spindle 3c upon which is mounted the cylindrical head 3b at the larger effective end of the spool which abuts the variable pressure spool chamber 6a, and a land 3d spaced axially from the head 3b, to define an alternating transfer spool chamber 12 between the head 3b and the land 3d. The land 3a is mounted on the spindle 3c at the smaller effective end which abuts the constant pressure spool chamber 6, and this land 3a slides in the part 4a of the spool cylinder which is of smaller diameter than the other part 4 of the spool cylinder in which the head 3b and the land 3d slide. Thus the variable pressure spool chamber 6a is defined between the outer face of the cylindrical spool head 3b and the inner face of the end 1b of the piston. An exhaust transfer spool chamber 13 is defined between the lands 3a and 3d. A transfer passage 14 (FIGURE 1a), continuously open to exhaust, is provided between the middle portion of the spool cylinder 4, 4a and the annular groove 8a in the piston cylinder 2, and a further transfer passage 15 is provided between the variable pressure spool chamber 6a and a middle part of the spool cylinder 4, 4a.

The effective area of the end of the head 3b of the spool 3 is greater than the effective area of the end of the land 3a at the opposite end of the spool, so that if fluid pressure in the variable pressure spool chamber 6a is equal to the fluid pressure in the constant pressure spool chamber 6 the spool will tend to travel against the direction of its bias, i.e. in the direction of arrow A. If the pressure supply from the inlet port 7 is cut off from the variable pressure spool chamber 6a and this chamber is placed in communication with the exhaust port 8 in the piston cylinder 2, the spool 3 will tend to travel in the direction of its bias, i.e. in the direction of arrow B.

Reciprocation of the spool 3 is therefore effected by alternating the pressure supply to and exhaust from the variable pressure spool chamber 6a which alternation is effected by the relative axial positioning between the spool, piston and cylinder, as will be described hereafter.

As previously stated, the spool 3 reciprocates intermittently, that is to say that it is stationary for a short period at each end of its stroke, during which period it is waiting for a pressure or exhaust signal to be transmitted by the movement of the piston. The piston 1 reciprocates substantially continuously, its reversal being virtually instantaneous, and it has no appreciable stationary period at the ends of its stroke.

To prevent stalling of the spool 3 the port 9a and the port 10a are so positioned that they are never both fully closed at the same time while the piston 1 is travelling, and likewise the ports 9b and 10b are so positioned that they are never both fully closed at the same time while the spool 3 is travelling within the piston 1. Consequently on initial application of fluid pressure to the port 7 the spool 3 will always tend to move to one or the other end of the spool cylinder 4, 4a in the piston, to commence reciprocation of the motor.

The operation of the motor during the various phases of the cycle will now be described in greater detail with reference to FIGURES 1, 1a to 6, 6a.

In FIGURES 1 and 1a, the piston is moving in the direction against its bias, i.e. in the direction of the arrow A. Fluid from the inlet port 7 is not only entering the annular groove 7a, and the constant pressure piston chamber 5, but is also passing into the constant pressure spool chamber 6, through the transverse passage 7b, and thus is holding the spool 3 stationary in a position at the end of its stroke in the direction of its bias; the variable pressure spool chamber 6a being open to exhaust by way of the transfer passage 15 (FIGURE 1a), the alternating transfer spool chamber 12, the port 10b, the second spool signalling passage 10 and the port 10a, which communicates with the annular groove 8a, which is open to the exhaust port 8. Fluid from the inlet port 7 is also passing through the annular groove 7a, and the constant pressure piston chamber 5, into the constant pressure spool chamber 6, and then through the port 11a, the piston feed passage 11 (FIGURE 1) and the port 11b to the variable pressure piston chamber 5a. Consequently the piston 1 is being caused to move in the direction against its bias, in the direction of arrow A.

As the piston 1 continues to move in the direction of the arrow A, the port 9a, is progressively opened to pressure although the port 9b is closed by the head 3b of the spool 3; while the port 10a (FIGURE 1a) is progressively closed, so as to shut off exhaust from the variable pressure spool chamber 6a through the transfer passage 15, the alternating transfer chamber 12, the port 10b and the second spool signalling passage 10.

Just before, and during reversal of the piston 1 (see FIGURES 2 and 2a) the port 10a is being uncovered from the land 2b of the piston cylinder 2, thus allowing pressure fluid to enter the alternating transfer spool chamber 12 through the second spool signalling passage 10 and the port 10b. Pressure fluid also passes from the alternating transfer spool chamber 12, through the transfer passage 15 into the variable pressure spool chamber 6a, thus initiating the movement of the spool 3 in the direction against its bias (arrow A), and opening the port 9b (FIGURE 2) to allow additional flow of pressure fluid through open port 9a and the first spool signalling passage 9 to the chamber 6a, as the head 3b of the spool 3 uncovers the port 9b.

When the movement of the spool in the direction against its bias is completed, as shown in FIGURES 3 and 3a, one end of the transfer passage 15 is closed by the head 3b (FIGURE 3a), and the port 11a (FIGURE 3) is also closed to pressure, after the land 3a has traversed it, but is open to exhaust, so that fluid escapes from the variable pressure piston chamber 5a through the port 11b, the piston signalling passage 11, the port 11a and the exhaust transfer spool chamber 13, and then by way of the transfer passage 14 into the groove 8a and out of the exhaust port 8, so that the piston 1 is enabled to reverse, to move in the direction of its bias (arrow B).

During the stroke of the piston in the direction of the bias (see FIGURES 4 and 4a) the port 9a is progressively closed to pressure by the land 2b and the port 10a is opened to exhaust through the groove 8a; further movement opens both port 9a and 10a to exhaust, as shown in FIGURES 5 and 5a thus allowing fluid from the variable pressure spool chamber 6a to start exhausting through the port 9b, the first spool signalling passage 9, the port 9a, the annular groove 8a and the exhaust port 8. As the spool 3 moves further in the direction of its bias (arrow B), exhaust is further effected by way of the transfer passage 15, the alternating transfer spool chamber 12, the port 10b, the second spool signalling passage 10, the port 10a, the groove 8a and the exhaust port 8.

When the spool 3 has completed its movement in the direction of its bias (arrow B), as shown in FIGURES 6 and 6a, the port 11a is closed to exhaust after the land 3a has traversed it, but re-opened to pressure through the constant pressure spool chamber 6, so that a change of pressure is signalled through the piston signalling passage 11 to the variable pressure piston chamber 5a, whereupon a further cycle of operation commences. The speed of reciprocation is controlled by the rate of flow of fluid through the motor.

Castellations are provided at each end of the piston 1, to act as mechanical stops and ensure freedom of fluid flow should the piston come to rest at one extreme position or the other. The projecting ends of the spindle 3c of the spool 3 serve to limit its travel only, but serve no other function.

It is to be understood that the foregoing description has been directed broadly to a fluid pressure operated mechanism which is only illustrated diagrammatically, and that it may apply equally to pneumatic (gas-pressure-operated) or to hydraulic (liquid-pressure-operated) mechanism, the detail modifications necessary for the particular type of fluid being obvious to a person skilled in the relevant art.

The reciprocating motion may be employed for percussive tools, machine tools, agricultural mowers and hedge trimmers e.g. to replace a pitman motion, for reciprocating a doctor blade longitudinally of a drum in a paper making machine, for vibrating fans, for sprinkling material during vitreous enamelling, or for vibrating precast concrete moulds, and for many other purposes.

The following definitions apply throughout this specification and the claims:

(a) By the expression "a constant pressure chamber" is meant a chamber in which, when the motor is connected to a source of fluid at predetermined pressure and continuous flow, the pressure will remain substantially constant so long as the load is constant.

(b) By the expression "a variable pressure chamber" is meant a chamber which, during the operation of the motor, is alternately placed in communication with inlet pressure and exhaust.

From the foregoing description it will be appreciated that in the presently preferred embodiment the spool is mounted within the piston. However, the disclosed arrangement of passages and ports which prevent stalling of the spool may be utilized with the spool and spool cylinder positioned externally of the piston. For example, the spool and associated structure may be positioned along side of the piston, in tandem with the piston, or positioned at a location remote from the piston.

In view of the foregoing, it will be appreciated that the present invention is susceptible to many changes and modifications without departing from the scope and spirit of the invention. It is intended to encompass all such changes and modifications as fall within the scope of the appended claims.

What is claimed is:

1. A fluid pressure operated motor for producing linear reciprocatory motion comprising a piston axially slidable within a piston cylinder defined by a housing, the piston having opposed working faces with different effective areas, the face of said piston having the smaller effective area and one part of said piston cylinder defining there between a constant pressure piston chamber, the face of said piston having the larger effective area and a further part of said piston cylinder defining there between a variable pressure piston chamber, means defining a fluid inlet port and a fluid exhaust port, inlet passage means connecting said inlet port with said constant pressure piston chamber to continuously supply pressure fluid to bias said piston in one direction, a piston signalling passage to connect said inlet port to said variable pressure piston chamber, exhaust passage means to connect said variable pressure piston chamber with said exhaust port, piston reversing means to alternately connect said inlet port and said exhaust port with said variable pressure piston chamber, said piston reversing means including a spool axially slidable within a spool cylinder defined by a spool housing, said spool in a first end position having valve means to prevent the supply of pressure fluid to said piston signalling passage and to said variable pressure piston chamber while enabling said piston signalling passage to communicate with said exhaust passage means whereby said piston is moved in the direction of its bias, said valve means on said spool in a second end position of said spool permitting flow of pressure fluid through said piston signalling passage to said variable pressure piston chamber and preventing flow of pressure fluid from said variable pressure piston chamber through said exhaust passage means to enable said piston to move in the direction opposite to its bias, said spool having opposed working faces with different effective areas, the working face of said spool having the smaller effective area and one part of the spool cylinder defining there between a constant pressure spool chamber, the working face of said spool having the larger effective area and a further part of the spool cylinder defining there between a variable pressure spool chamber, and spool reversing means to periodically actuate said spool from the first end position to the second end position and vice versa, said spool reversing means including first and second spool signalling passages each having an inner port opening into said variable pressure spool chamber and each having an outer port adapted to alternately communicate with said inlet port and said exhaust port, valve means operatively connected to said piston so that upon commencement of movement of the piston in one sense of direction said first and second spool signalling passages are initially sequentially closed from communication with said exhaust port and upon further movement of said piston are sequentially opened to communication with pressure fluid from said inlet port to enable flow of pressure fluid to said variable pressure spool chamber to effect movement of said spool from the second end position thereof towards the first end position, said first and second spool signalling passages and the associated valve means being arranged so that the outer ports of the passages are not both fully closed at the same time, the inner parts of the passages are not both fully closed at the same time and so that when the piston signalling passage is closed by the valve means on the spool to communication both with the exhaust passage means and also with the inlet passage means, both inner ports of the spool signalling passages are open.

2. A motor according to claim 1, wherein the valve means on the spool includes a land of the spool which land, during axial movement of the spool, controls the opening and closing of a port in the spool cylinder to the piston signalling passage, and further comprising additional valve means connected to the spool to selectively close and open the inner ports of the spool signalling passages, the additional valve means including the part of the spool having the working face of larger effective area.

3. A motor according to claim 2, wherein, with said spool contiguous to said second end position, the part of said spool having the working face of larger effective area blocks the inner port of said first spool signalling passage and is spaced from the inner port of said second spool signalling passage, and a transfer passage is provided having one end adapted to communicate with the inner port of said second spool signalling passage and having the other end communicating with said variable pressure spool chamber when said spool is in said second end position so that upon movement of said piston in the direction opposite to its bias and the subsequent closing of the outer port of said second spool signalling passage from communication with said exhaust port by said valve means operatively connected to said piston, movement of said spool from said second end position commences with flow of pressure fluid through said transfer passage to said variable pressure spool chamber.

4. A motor according to claim 2, wherein the inner and outer ports of said first spool signalling passage are positioned so that initial movement of said spool from the second end position moves the part of the spool having the working face of larger effective area from the position blocking the inner port of said first spool signalling passage with the outer port thereof already in communication with said inlet port whereby additional pressure fluid is supplied through said first spool signalling passage to said variable pressure spool chamber to effect further movement of said spool towards said first end position.

5. A motor according to claim 1, wherein said piston reversing means reciprocate said piston substantially continuously at a relatively low speed as compared with the speed of reciprocation of said spool, and wherein said spool reversing means allow said spool to remain stationary for short periods at each of said end positions.

6. A motor according to claim 1, wherein the ends of the piston provide the opposed working faces thereof, the end of the piston having the smaller effective area and one end of the piston cylinder together defining the constant pressure piston chamber, and the end of the piston having the larger effective area and the other end of the piston cylinder together defining the variable pressure piston chamber.

7. A motor according to claim 1, wherein the ends of the spool provide the opposed working faces thereof, the end of the spool having the smaller effective area and one end of the spool cylinder together defining the constant pressure spool chamber, and the end of the spool having the larger effective area and the other end of the spool cylinder together defining the variable pressure spool chamber.

8. A motor according to claim 3, wherein the transfer passage is defined by the spool housing.

9. A motor according to claim 1, wherein the spool and piston are substantially coaxial.

10. A motor according to claim 1, wherein the spool housing and piston housing are integral.

11. A motor according to claim 9, wherein said piston is hollow, and said spool is disposed within said piston with the inner surfaces of the piston constituting said spool cylinder.

12. A motor according to claim 11, wherein said first and second spool signalling passages are disposed in said piston, and said valve means operatively connected to said piston comprise a land provided on the inner surface of said piston cylinder.

13. A motor according to claim 1, wherein said spool cylinder is formed in two parts of different diameters with the end of the spool having the larger effective area disposed within the part of larger diameter and the end of the spool having the smaller effective area disposed within the part of smaller diameter, and a land provided on said spool intermediate its ends to define in conjunction with the end of larger effective area an alternating transfer spool chamber and to define in conjunction with the end of smaller effective area an exhaust transfer chamber constituting part of said exhaust passage means, and means defining a transfer passage communicating between said variable pressure spool chamber and said alternating transfer spool chamber when said spool is contiguous to its second end position.

14. A motor according to claim 13, wherein movement of said spool in said spool cylinder causes said land to alternately open and close communication between said alternating transfer spool chamber and said second spool signalling passage to intermittently subject said alternating transfer spool chamber to pressure or exhaust.

References Cited

UNITED STATES PATENTS

| | | | |
|---|---|---|---|
| 208,449 | 9/1878 | Winchester | 91—224 |
| 384,186 | 6/1888 | Barth | 91—225 |
| 426,612 | 4/1890 | Ball | 91—227 |
| 931,449 | 8/1909 | Mauss | 91—224 |
| 1,031,340 | 7/1912 | Howard | 91—224 |

PAUL E. MASLOUSKY, *Primary Examiner.*